US008049940B2

(12) United States Patent
Harman et al.

(10) Patent No.: US 8,049,940 B2
(45) Date of Patent: Nov. 1, 2011

(54) REPRINT FUNCTION FOR MAILPIECE INSERTERS

(75) Inventors: James L. Harman, Southport, CT (US); Joseph D. Collins, Watertown, CT (US); Patrick Rolling, Southington, CT (US); Michael D. Fappiano, Waterbury, CT (US); David R. Welch, Shelton, CT (US); Vishnu Sharma, Hamden, CT (US)

(73) Assignee: Pitney Bowes Inc., Stamford, CT (US)

( * ) Notice: Subject to any disclaimer, the term of this patent is extended or adjusted under 35 U.S.C. 154(b) by 1477 days.

(21) Appl. No.: 11/344,348

(22) Filed: Jan. 31, 2006

(65) Prior Publication Data

US 2007/0177764 A1 Aug. 2, 2007

(51) Int. Cl.
*H04N 1/46* (2006.01)
*G06F 9/44* (2006.01)
*G06K 9/00* (2006.01)

(52) U.S. Cl. ........ 358/540; 358/501; 717/116; 717/165; 382/101

(58) Field of Classification Search ................. 358/1.14, 358/501, 540, 448, 462; 382/103; 707/601; 717/143, 116, 165, 159; D18/36, 46
See application file for complete search history.

(56) References Cited

U.S. PATENT DOCUMENTS 5,243,655 A * 9/1993 Wang .............................. 380/51
5,327,559 A * 7/1994 Priven et al. .................. 718/101
5,937,411 A * 8/1999 Becker .................................. 1/1
6,030,132 A 2/2000 Harman et al. ................. 400/62
6,311,103 B1 10/2001 Hart, Jr. et al. ............... 700/220
6,311,104 B1 10/2001 Shea et al. .................... 700/222
6,327,515 B1 12/2001 Shea et al. .................... 700/221
6,433,881 B1 8/2002 Lynch et al. ................. 358/1.13
6,466,935 B1 * 10/2002 Stuart ............................. 707/10
6,581,097 B1 6/2003 Lynch et al. .................. 709/226
6,657,744 B2 12/2003 Lynch et al. ................. 358/1.15
6,658,430 B1 12/2003 Harman ..................... 707/104.1
6,714,835 B1 3/2004 Hart, Jr. et al. ............... 700/220
6,732,011 B1 5/2004 Hart, Jr. et al. ............... 700/223

(Continued)

FOREIGN PATENT DOCUMENTS

EP 0806721 A1 11/1997
EP 0980719 A2 2/2000

OTHER PUBLICATIONS

Wikipedia Encyclopedia Portable Executable Jan. 2005 Wikipedia Encyclopedia p. 1.*

(Continued)

*Primary Examiner* — Benny Tieu
*Assistant Examiner* — Ngon Nguyen
(74) *Attorney, Agent, or Firm* — Brian A. Collins; Charles R. Malandra, Jr.; Steven J. Shapiro

(57) ABSTRACT

A method is provided for reprinting damaged mailpieces for use in a mailpiece inserter. The method comprising the steps of producing an object-oriented data file of the mailpiece content material including a scan code and storing the object-oriented data files in a reprint repository. The status of a mail run is tracked as mailpieces are fabricated and the results are recorded in a reprint file. The results record whether a mailpiece was successfully fabricated and reprint files are generated in connection with unsuccessfully fabricated mailpieces.

13 Claims, 9 Drawing Sheets

U.S. PATENT DOCUMENTS

| | | | | |
|---|---|---|---|---|
| 6,762,851 | B1 | 7/2004 | Lynch et al. | 358/1.15 |
| 6,901,312 | B2 | 5/2005 | Hart, Jr. et al. | 700/223 |
| 7,729,004 | B2 * | 6/2010 | Currans et al. | 358/1.18 |
| 7,814,551 | B2 * | 10/2010 | Darweesh et al. | 726/26 |
| 2002/0087338 | A1 * | 7/2002 | Haydt, III | 705/1 |
| 2003/0079052 | A1 * | 4/2003 | Kushnirskiy | 709/328 |
| 2004/0190057 | A1 | 9/2004 | Takahashi | |

OTHER PUBLICATIONS

Arthur van Hoff Class java.util.Hashtable Jul. 1998 Users.cs.fiu.edu all pages.*

JavaToolBox JPF Framework Jul. 2005 JavaToolbox p. 1.*

Chris Heald Supporting an advanced Object-Oriented programming language in Eclipse Unsiversity of New York p. 27-34.*

Wong et al. Principles of Object-Oriented Programming Spring 2005 Java JAR Files pp. 1-3.*

Montlick What is Object-Oriented Software 1995-1999 Software Design Consultant, LLC pp. 1-7.*

Aiken Java Plugin Framework Dec. 2005 pp. 3-4.*

Chris Heald Supporting an advanced Object-Oriented programming language in Eclipse, Mar. 16, 2005, University of New York p. 27-34.*

* cited by examiner

REPRINT FUNCTION FOR MAILPIECE INSERTERS

RELATED APPLICATIONS

This patent application relates to commonly-owned, co-pending U.S. Publication Number 2007/0179,664 entitled "DOCUMENT FORMAT AND PRINT STREAM MODIFICATION FOR FABRICATING MAILPIECES" and commonly-owned, co-pending U.S. Publication Number 2000/0176356 entitled "RULES ENGINE FOR MAILPIECE INSERTERS".

TECHNICAL FIELD

The present invention relates generally to an apparatus for producing mailpieces, and, more particularly, to a new and useful method for preparing an electronic file, i.e., a print job, for reprinting damaged or defective mailpieces.

BACKGROUND OF THE INVENTION

A mail insertion system or a "mailpiece inserter" is commonly employed for producing mailpieces intended for mass mail communications. Such mailpiece inserters are typically used by organizations such as banks, insurance companies and utility companies for producing a large volume of specific mail communications where the contents of each mailpiece are directed to a particular addressee. Also, other organizations, such as direct mailers, use mailpiece inserters for producing mass mailings where the contents of each mailpiece are substantially identical with respect to each addressee.

In many respects, a typical inserter system resembles a manufacturing assembly line. Sheets and other raw materials (i.e., a web of paper stock, enclosures, and envelopes) enter the inserter system as inputs. Various modules or workstations in the inserter system work cooperatively to process the sheets until a finished mail piece is produced. Typically, inserter systems prepare mail pieces by arranging preprinted sheets of material into a collation, i.e., the content material of the mail piece, on a transport deck. The collation of preprinted sheets may continue to a chassis module where additional sheets or inserts may be added based upon predefined criteria, e.g., an insert being sent to addressees in a particular geographic region. Subsequently, the collation may be folded and placed into envelopes. Once filled, the envelopes are closed, sealed, weighed, and sorted. A postage meter may then be used to apply postage indicia based upon the weight and/or size of the mail piece.

The capacity, configuration and features of each inserter system depend upon the needs of each customer and/or installation. Until recently, mailpiece inserters were limited to two basic configurations, i.e., low-volume inserters capable of producing between about 5K-10K mailpieces monthly, and high-volume inserters capable of producing in excess of 100K mailpieces daily. To contrast the differences in greater detail, low volume inserters may occupy the space of a conventional office copier and generally will cost less than about twenty-thousand dollars ($20,000). High-volume inserters may extent over 100 feet in length and cost in excess of five million dollars ($5,000,000). Only recently have manufacturers introduced models having an intermediate capacity, i.e., producing between 50K-100K mailpieces monthly. An exemplary model fulfilling these specifications is the Sebring Model inserter produced by Pitney Bowes Inc., located in Stamford, Conn., USA.

While system capacity significantly impacts productivity, it should also be appreciated that capacity also influences other processes of the mailpiece inserter, i.e., impacts certain practical aspects of system operation. For example, a typical inserter may exhibit a rejection rate of about five percent (5%) of the total mailpiece volume. That is, five percent (5%) of the total number of mailpieces may necessitate re-printing due to damage incurred by paper jams, mishandled paper, missing or unidentified sheet material, inaccurate fold lines, improper sealing, etc. In low capacity machines, the percentage of mailpieces requiring re-print may equal a small number, e.g., 10 mailpieces daily, which can readily be re-printed without the need to re-run an entire print job. Moreover, if the job involved the printing of payroll checks, it will be appreciated that, for security reasons/theft avoidance, re-printing of checks must be minimized and closely monitored. As such, it is common for low capacity machines to have limited re-print capability, e.g., simply identifying those documents which were improperly completed/printed. Once the misprinted checks have been identified, separate individual checks may be printed and mailed, i.e., often by a department charged with such activities such as a payroll or accounting department.

High capacity inserters, on the other hand, yield a much higher number of reject mailpieces requiring reprint. In addition to document identification (which can be used to identify both completed and misprinted documents/mailpieces), these systems are oftentimes equipped with optical scanning or recording devices for storing a digitized picture of each document handled by the inserter. That is, as documents pass from an initial feed station to subsequent handling stations, a picture of the document may be captured and stored. Thereafter, documents are optically tracked via photocells disposed along the feed path of the inserter for the purpose of recording the status of the document, i.e., whether the document successfully passed to completion or failed in-process.

Due to the potentially large number of incomplete documents, such inserters are typically operated by means of intelligent software. The operating software may be capable of preparing a print job comprising a list/compilation of documents which have been identified as candidates for reprint. The list/compilation may be generated automatically by the inserter's system software and/or manually at the request of an operator. Regarding the latter, an operator may visually inspect mailpieces for certain aesthetic deficiencies, e.g., such as a blurred/partially legible mailing address, which, in the opinion of the operator, does not pass certain quality standards and, as such, is unsuitable for mailing.

While low capacity inserters typically have limited reprint features, high capacity machines, which include integral processing capability, can readily retrieve document identification numbers for re-printing defective documents. Alternatively, high capacity mailpiece inserters can use the digitized pictures of the processed documents, prepare a print job of the defective documents and automatically/manually reprint the documents. It will be appreciated that this reprint capability is particularly valuable for high volume inserters which produce a proportionately large quantity of defective documents.

While high volume inserters are capable of handling and reprinting a large quantity of defective documents, the data used to reproduce the documents are merely digitized photos incapable of being changed or manipulated. For example, if the original error or deficiency arose from the document content "as printed", then the defect is, once again, passed along to the reprint job. Furthermore, since reprint jobs are typically formatted in accordance with a predetermined numeric sequence, the operator must reprint all of the defective mailpieces which each run. That is, the operator is not provided the ability to selectively reprint defective documents.

A need, therefore, exists for an inserter having the capability to selectively reprint large quantities of the original print job, i.e., whether or not the requirement for reprinting such documents was due to a document error or deficiency, and the ability to manipulate the document should the error or deficiency be contained within the original printed image thereof.

SUMMARY OF THE INVENTION

A method is provided for reprinting damaged mailpieces for use in a mailpiece inserter. The method comprising the steps of producing an object-oriented data file of the mailpiece content material including a scan code and storing the object-oriented data files in a reprint repository. The status of a mail run is tracked as mailpieces are fabricated and the results are recorded in a reprint file. The results record whether a mailpiece was successfully fabricated and reprint files are generated in connection with unsuccessfully fabricated mailpieces.

BRIEF DESCRIPTION OF THE DRAWINGS

FIG. 6 depicts a PDF rendering of a mailpiece document on a UI monitor for defining fields used by the rules engine plug-in.

BEST MODE TO CARRY OUT THE INVENTION

Figure 1:
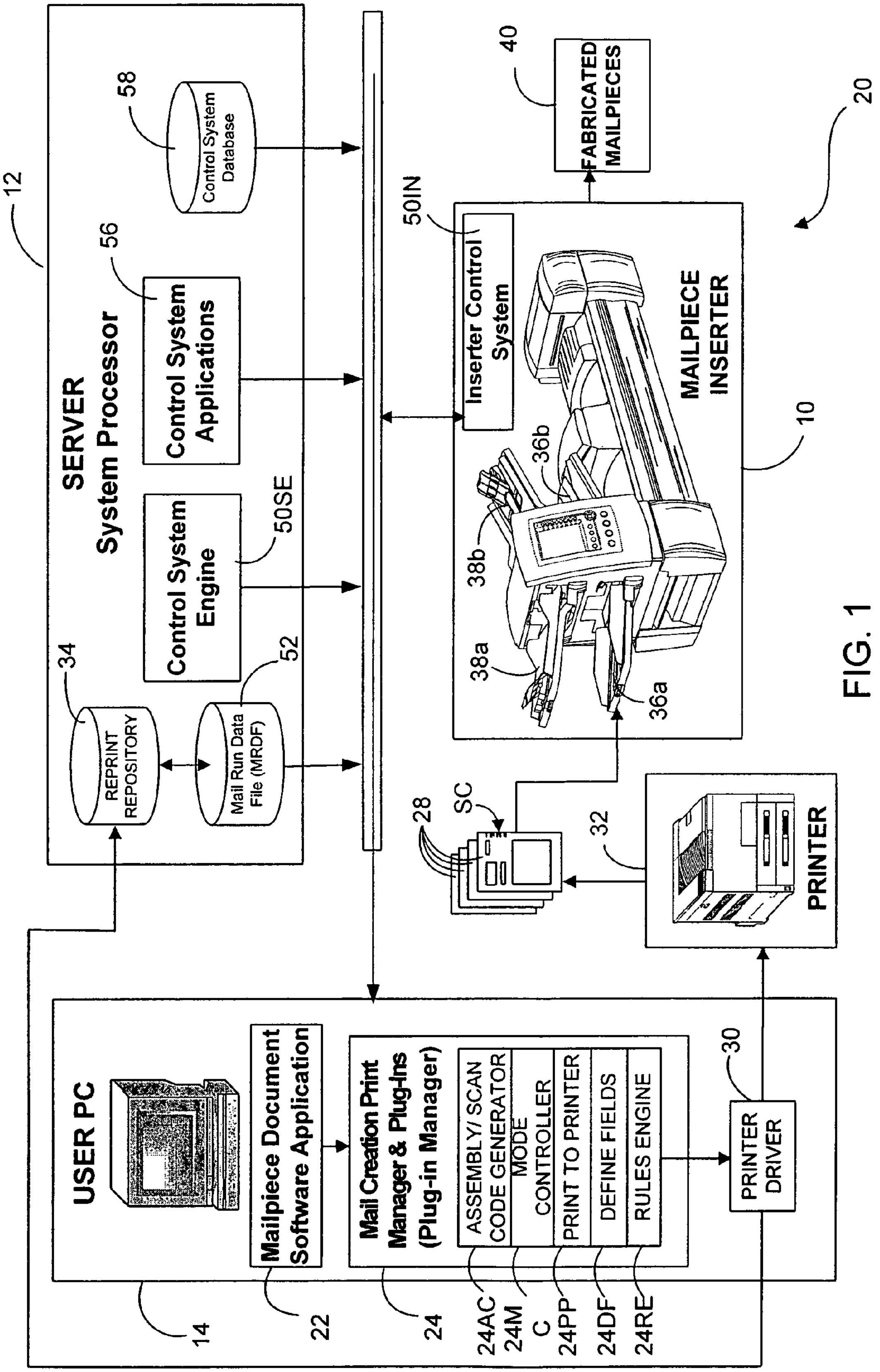
FIG. 1 schematically depicts the system architecture of a mailpiece insertion system according to the teachings of the present invention including a mailpiece inserter, a server/system processor and a User PC, which mailpiece insertion system is adapted to create, manipulate and print finished mailpieces.
Figure 1A:
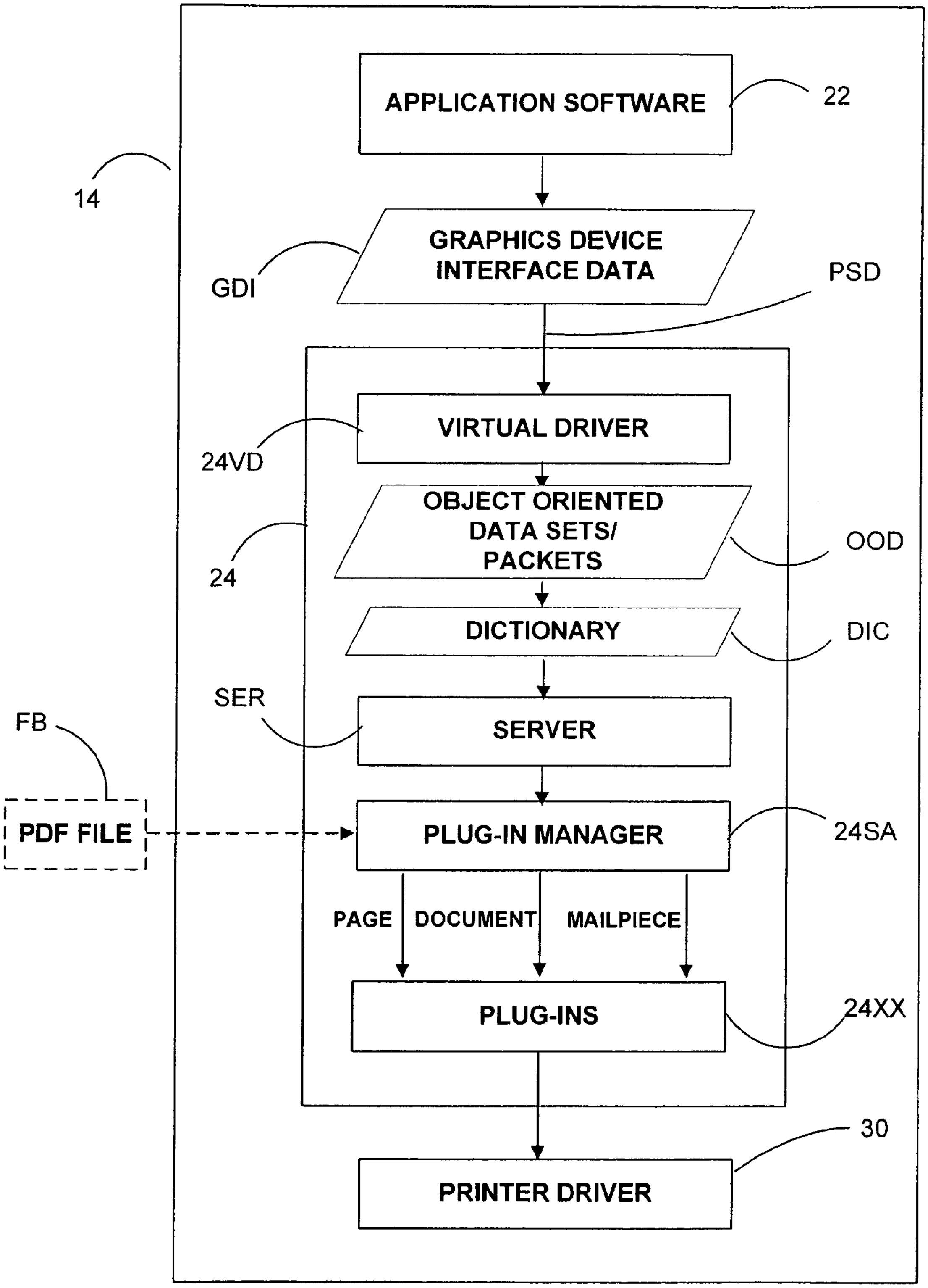
FIG. 1*a* depicts various elements of the User PC including a virtual driver for converting print stream data of an application into object oriented data for subsequent processing by various system plug-ins/modules.
Figure 1B:
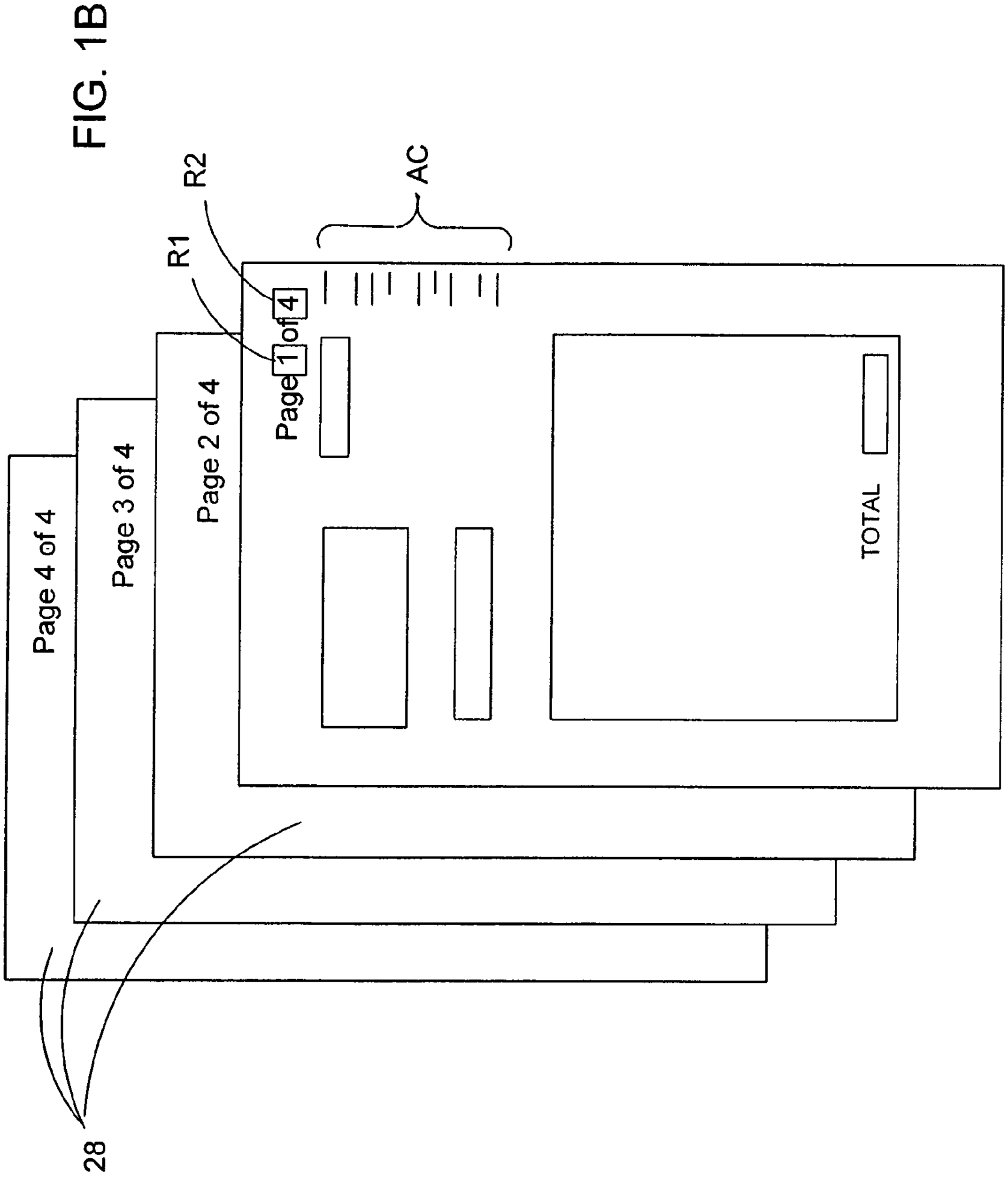
FIG. 1*b* depicts a stack of mailpiece content material having an assembly or scan code incorporated in the document for providing instructions in connection with the assembly of the mailpiece by the mailpiece inserter.
Figure 2:
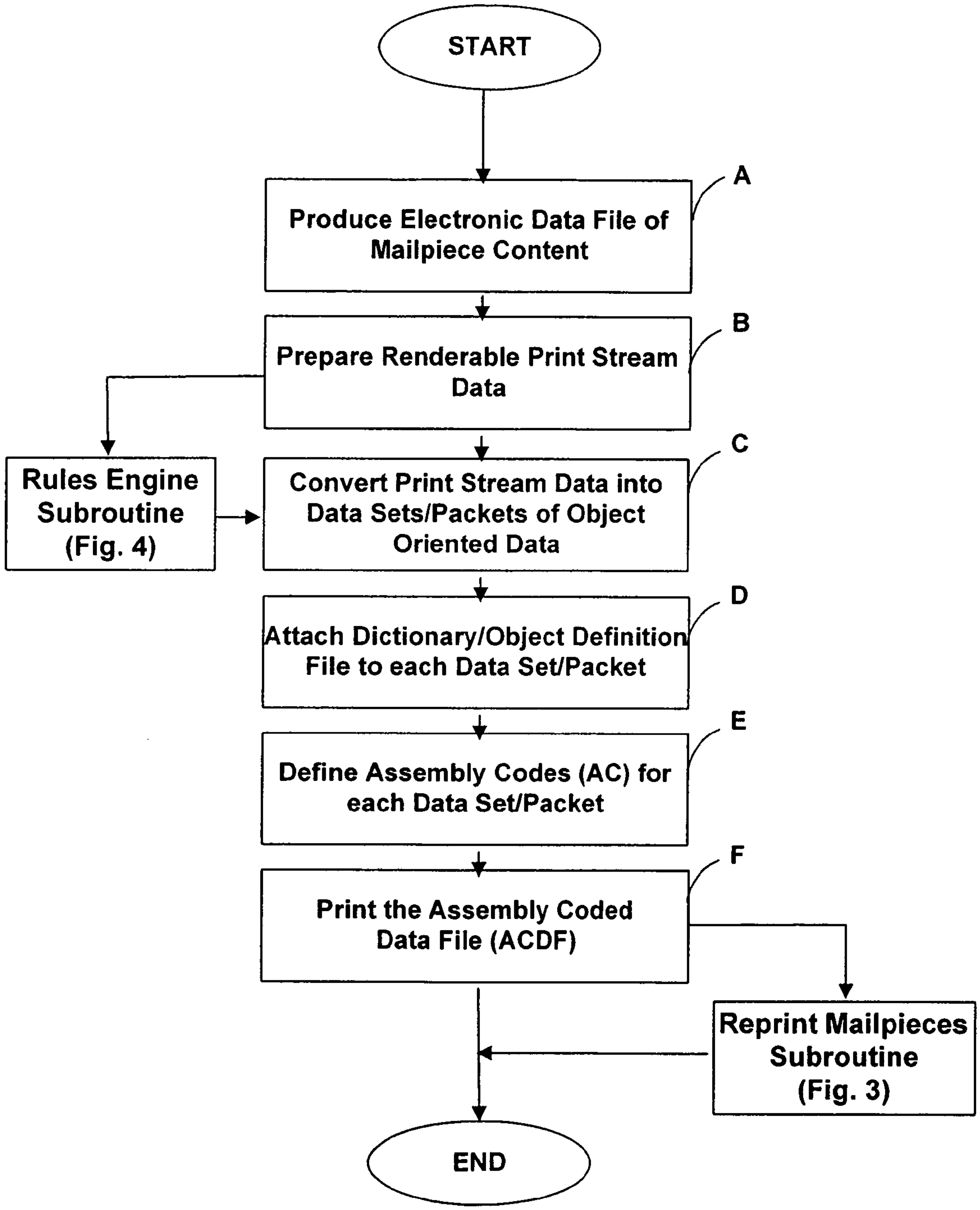
FIG. 2 is a block diagram of the method steps for practicing the teachings of the present invention in the mailpiece inserter.

The inventive method for producing and/or reprinting mailpieces is described in the context of a mailpiece inserter system. Before discussing the various method steps employed for practicing the inventive method, it is useful to understand the system architecture of the inserter including the cooperation of the various components and system elements. In FIGS. 1, 1*a* and 1*b*, the principle elements of the Mailpiece Assembly System/Architecture 20 comprise a mailpiece inserter 10, a system processor 12 (e.g., a server) and a client/user processor 14, (e.g., a user PC). Each of the system elements 10, 12, 14, is capable of accepting operator inputs, e.g., from an operator input device such as a keyboard or mouse, displaying outputs via a display monitor, and running program code on a system processor. Inasmuch as the elements 10, 12, 14 are network connected, inputs/outputs may be made/displayed from any of the system elements 10, 12, and 14. Notwithstanding the capabilities of each, the server/system processor 12 monitors and records information about mailpieces being processed on the mailpiece inserter 10. At the same time, the client/user processor 14 runs various application software 22 and system plug-ins 24 to create mailpiece content used by the mailpiece inserter 10 to produce finished mailpieces.

The system elements 10, 12, and 14 may function in a closed- or open-loop operating mode. The principle difference in the operating modes relates to whether the system elements communicate in real-time over a network line NL, or autonomously based upon predetermined algorithms. In a closed-loop operating mode the various system elements communicate to convey, monitor, and record information concerning the fabrication of each mailpiece. That is, the system elements 10, 12, and 14 share and store critical information which will be used to correctly assemble, detect errors/deficiencies in, and reprint, mailpieces. More specifically, the User PC runs prior to processing in the closed loop mode to produce the mailpiece documents and mail run data file while the mailpiece inserter 10 and system server 12 communicate in real-time. In an open loop operating mode, the server 12 is not required hence, the inserter 10 operates autonomously/independently and relies upon preprogrammed information internal to the mailpiece inserter 10 to provide the necessary mailpiece assembly instructions.

Whether operating in a closed- or open-loop configuration, the system architecture 20 employs an assembly instruction code AC (i.e., either a mailpiece or scan code) to communicate information concerning the fabrication of a mailpiece from the user processor 14 to the mailpiece inserter 10. In the context used herein, an "assembly or instruction code AC" (see FIG. 1*b*) is a mark or set of marks placed on the content sheets 28 of a mailpiece (typically in the right- or left-hand margin of the document) to control one or more operations/functions of the mailpiece inserter 10. One such control operation may include information concerning when a new document begins and/or ends in a stack of mailpiece content sheets, i.e., the initial and/or final page of a document. With this information the mailpiece inserter 10 can properly segregate one set of content sheets from those of another. The user processor 14 can upload the assembly instruction code AC from the inserter 10 (if the user processor 14 is connected via a network line NL), and incorporate the appropriate mark (e.g., a numeric identification number) into an object-oriented data file of the mailpiece content material. Alternatively, the user processor 14 can rely upon preprogrammed information of a Mail Creation Print Manager 24 to produce an assembly code AC in the converted image. The significance of converting the electronic file of the mailpiece content material into to an object-oriented data file and the use of the Mail Creation Print Manager 24 will be discussed in greater detail in subsequent paragraphs.

In one embodiment of the invention, a method is provided for producing content material from an electronic application file indicative of a logical document. The method comprises the steps of: (i) producing an electronic file of content material a the software application (ii) generating a print stream of data from the electronic file in a renderable format, (iii) converting the print stream into object-oriented data having defined objects, the objects defined or indexed by an object dictionary, (iv) parsing or segmenting the object-oriented data into a plurality of data sets, each data set comprising at least one data packet, (v) attaching the object dictionary to each data set, (vi) processing the data sets to create at least one logical document and (vii) printing the logical document for use in combination with a mailpiece inserter system.

Referring to FIGS. 1, 1*a*, 1*b* and 2, an application 22 such as a word processing, spreadsheet or graphics program is used in Step A to perform user space processes to generate an electronic data file of the mailpiece content. The application 22 is executed or run by an operating system for conducting and controlling various kernel space processes. An exemplary operating system which may be adapted to employ the teachings of the invention includes Windows® 2000 OS (Windows is a registered trademark of Microsoft Corporation having its principle base of operations in the State of Washington, USA). It should be appreciated, however, that the invention may be adapted to employ any operating system.

In step B, the operator inputs a print command which causes the application to generate a print stream of renderable data. That is, a Graphics Device Interface (GDI) applicable to a Windows-based Operating System (OS) is used by the application to appropriately render the text and graphics of the mailpiece content material. The GDI functions can be used to draw text, create paths, and generate bitmap & graphic images (e.g., lines, curves, closed figures, etc.). Furthermore, the application software can use the GDI functions to set operating modes and make current selections for an output device, e.g., a printer or video display. The operating modes may include: (a) the text and background colors, (b) the mixing mode which specifies how colors combine with colors already existing on the display surface, and (c) the mapping mode which dictates how coordinates used by the application software are mapped relative to the coordinate system of the output device. The current selections may identify which drawing objects (e.g., pens, brushes and fonts) are to be used. Inasmuch as the code/algorithms to generate such attributes are generally known to those skilled in the art, such program code is not discussed in greater detail herein. It is suffice to say that the attributes are defined using such devices as a GDI (or similar program code) for rendering the print stream data.

In step C, the Print Stream Data (PSD) rendered by the GDI (see FIG. 1*a*) is converted into object-oriented data OOD such as those objects/definitions/dictionaries employed in Portable Document Format (PDF) files. Inasmuch as a PDF conversion has become known in the industry as a universal term for an object-oriented data file, the terms PDF data and object-oriented data may be used interchangeably. However, it should be appreciated that such conversion is not limited to the specific objects/attributes typically assigned to/defined by PDF documents. For example, metacode data has some of the same features/attributes as PDF data, but in the broadest sense is, nonetheless, object-oriented data.

Returning to our discussion of Step C, the print stream data PSD is intercepted and manipulated by a Mail Creation Print Manager and associated Plug-in modules in preparation for printing by a conventional printer driver 30. More specifically, in FIG. 1*a* the program code of a Virtual Print Driver 24PD is adapted to convert the print stream data PSD (generated in response to an operator print command) into Object-Oriented Data OOD having defined objects/attributes. As mentioned in the preceding paragraph, the objects/attributes of the object oriented data OOD are essentially the same as those employed in PDF documents, though the objects selected and attributes assigned may have different meanings depending upon the selected format. Moreover, these objects are indexed in an object dictionary DIC (or header) for locating/identifying the data within the print stream.

The print stream data PSD is then parsed or segmented into a plurality of data sets which may each comprise one or more data packets. The number and size of the data sets are generally determined by the size of an individual page of the original document though the data packets may be smaller and contain multiple packets (e.g., two or more) for comprising a data set. In step D, the dictionary is attached/coupled to each data set, hence resulting in multiple data sets each having a shared object dictionary. The object dictionary may be common to many of the data sets, or may be individually modified or configured to index/identify the objects of a specific data set/packet. Hence, by attaching a configurable dictionary to each data set/packet the individual data sets/packets may be specifically, modified and manipulated.

By segmenting the print steam data into a plurality of data sets (each having an attached/coupled dictionary), throughput of the mailpiece inserter is significantly enhanced. That is, by segmenting the PSD into smaller units, the printer driver can begin incrementally printing of the segmented data. Accordingly, printing can begin before the entire electronic file and dictionary contents are completely processed (the dictionary is typically appended to the end of the electronic file). Furthermore. conversion of the print stream data into Object-Oriented Data OOD provides a unique opportunity to enable and perform manipulation of the print stream data PSD from the application software. For example, the OOD enables the user/system operator to define regions within the document, read from identified regions, extract information from select regions, perform operations on information contained in a specific region, insert new information (e.g., insert scan codes), re-order pages of the mailpiece contents, change its pagination, add and/or delete pages from the mailpiece contents, etc. Consequently, the object-oriented data provides significantly greater flexibility and capability to modify, manipulate, insert and/or extract information in connection with content material production/mailpiece fabrication than has been heretofore been directly available to the user/system operator. Furthermore, in the context of a mailpiece inserter, such capability was only available through the combined efforts of the OEM, skilled in the programming language used to operate the mailpiece inserter, and the customer having knowledge concerning the unique requirements and purpose of the mailpiece run data file.

A server application 24SA is then employed to reconstitute the object oriented data and dictionary OOD into individual pages, i.e., the predetermined smallest building block of the mail run data file. Next, the Plug-in Manager 24 PI divides and tracks the data as pages, documents, or mail pieces, depending upon the optimization and timing requirements. Such PI managers are well-known in the art for optimizing and timing the throughput of data, hence no further discussion of the optimization algorithms are provided nor such details warranted.

Additionally, various modules or Plug-Ins 24XX are adapted to modify, manipulate and print the data pursuant to the requirements of a logical document. A logical document is any compilation of data arranged in accordance with the commands and controls implemented by the various plug-ins. Finally, the OOD is converted back into renderable data recognizable by the specific printer driver 30 which converts the OOD into the necessary printer control language PCL for being printed using conventional printer hardware.

In Step E, an assembly/scan code AC is defined indicative of the instructions for each of the mailpieces 28. To develop and execute the assembly code AC, the plug in manager 24 (see FIG. 1) includes a plurality of mailpiece plug-ins or modules 24 CG, 24MC, 24PP, 24DF, 24RE, etc. each having distinct and essentially autonomous functions. Furthermore, the Plug-in Manager 24 enables/disables these plug-ins and manages the workflow for running a particular print job. It should also be appreciated that defining an assembly code AC need not occur at this time, but may be developed at any time prior or subsequent to rendering the print stream data PSD. Table I below is a list and brief description of the various plug-ins managed by the Plug-In Manager 24.

TABLE I

| PLUG-IN | DESCRIPTION |
|---|---|
| ASSEMBLY/ SCAN CODE GENERATOR | PRODUCES AN OMR, BARCODE, OR OTHER SYMBOLOGY TO PROVIDE INSTRUCTIONS RE: MAILPIECE ASSEMBLY FOR THE MAILPIECE INSERTER |
| PRINT/ CONVERT TO OOD/PDF | USING A GRAPICS DEVICE INTERFACE (GDI) OR VIRTUAL PRINT DRIVER, THE APPLICATION SOFTWARE FILE IS CONVERTED TO AN OBJECT ORIENTED/PORTABLE DOCUMENT FORMAT (PDF) FILE. |
| PRINT TO PRINTER | SENDS AN OBJECT ORIENTED/PORTABLE DOCUMENT FORMAT (OOD/PDF INCLUDING SCAN CODES) TO PRINT DRIVER |
| PRINT PREVIEW | DISPLAYS THE CPDF IMAGE IN ACCORDANCE WITH THE FORMAT THAT THE DOCUMENT WILL BE PRINTED I.E., ON THE SELECTED PRINTER. |
| DOCUMENT BREAK | DETERMINES WHERE IN THE PRINT STREAM ONE DOCUMENT ENDS AND A NEW DOCUMENT BEGINS. RULES ARE USED TO DETERMINE WHEN A SET OF PAGES COMPRISE A LOGICAL DOCUMENT. |
| DUPLEX PRINTING | DETERMINES THE PRINTING SEQUENCE FOR PRINTING ON TWO SIDES OF THE MAILPIECE CONTENT MATERIAL. |
| FEATURES/ DOCUMENT SELECTION | DETERMINES HOW MAILPIECE CONTENT MATERIAL WILL BE GROUPED OR SORTED. ALSO USED TO SELECT WHICH PLUG-INS WILL BE USED TO PROCESS THE PRINT STREAM. |
| DEFINE FIELDS | DEFINES THE SPATIAL LOCATION OF A FIELD (HIGHLIGHTED OR OTHERWISE DESIGNATED BY A USER) ON A DISPLAYED IMAGE OF A MAILPIECE DOCUMENT. SUCH FIELDS ARE THEN USED BY A RULES ENGINE TO ACCESS AND MANIPULATE THE CONTENTS OF THE OBJECT ORIENTED/PDF DATA/PAGE. |
| RULES EDITOR | PROVIDES THE USER WITH THE CAPABILITY TO MODIFY BASIC RULES AND EXPRESSIONS. TESTING AND CONFIRMATION OF THE RULES MAY ALSO BE PERFORMED USING THIS PLUG-IN. |
| JOB SELECTION | SELECTS WHICH JOB WILL BE PERFORMED BY WHICH INSERTER, I.E., IF THE SERVER CONTROLS MULTIPLE MAILPIECE INSERTERS. ALSO ALLOWS THE USER TO SELECT A PREVIOUSLY SAVED SET OF PRINT STREAM INTERCEPTION SETTINGS. |
| MACHINE SET-UP | DEFINES THE INSERTER SET-UP FOR FABRICATING THE MAILPIECE, E.G., THE MACHINE SET-UP FOR A MAILPIECE HAVING A C-SHAPE OR Z-SHAPE FOLD CONFIGURATION. |
| MAILPIECE TRACKING | MONITORS AND TRACKS THE STATUS OF MAILPIECES, I.E., WHETHER A MAILPIECE IS SUCCESSFULLY COMPLETED, FOR THE PURPOSE OF ESTABLISHING A REPRINT JOB FUNCTION. ALSO CREATES THE MAIL RUN DATA FILE AND REPRINT FILE, SETS/ SAVES MAILPIECE TRACKING OPTIONS, DETERMINES WHEN A DOCUMENT IS TO BE DIVERTED, WHEN AN OPTIONAL INSERT SHOULD BE USED, AND WHEN AN AUDIT PIECE SHOULD BE GENERATED.. |
| ADDITIONAL RULES | ALLOS USERS TO DEVINE ARBITARY RULES THAT ARE PROCESSED FOR EACH PAGE, DOCUMENT AND MAILPIECE FOR THE ENTIRE INPUT FILE. |

To produce an assembly/scan code AC, the Mailpiece Print/Plug-in Manager 24 includes an Assembly/Scan Code Generator plug-in 24CG which converts various user/system operator commands into a symbolic representation (e.g., a numeric identifier, OMR marks or Barcode Symbology). These symbolic markings are recognizable by the mailpiece inserter 10 for performing various assembly instructions. More specifically, the Mailpiece Print/Plug-in Manager 24 processes input commands by calling upon the appropriate plug-in(s) capable of processing specific input commands. Examples of input commands may be represented by an assembly/scan code, or a portion thereof, include, (i) document breaks, i.e., where a document begins and ends using a Document Break plug-in, (ii) document printing, e.g., whether the document is printed on a single side or is double-sided by employing a Duplex Printing plug-in, (iii) document combinations, e.g., documents having identical addresses may be combined into a single envelope using a Document Selection plug-in, and (iv) document rules, e.g., documents having an invoice total exceeding a threshold value may receive an insert as determined by the mailpiece creation plug-in using the Rules Engine. The Mailpiece Print/Plug-in Manager 24 then produces/selects an assembly/scan code configuration which symbolically represents the various input commands. The assembly/scan codes AC may take a variety of forms including a series of long and short bars (OMR marks) disposed at a predetermined location or region of the PDF document. Typically such marks SC will appear in the right- or left-hand margin of a document (see FIG. 1*a*).

In step F, the object-oriented data file, including the scan code data (produced in by the Mail Creation Print Manager & Plug-ins 24 shown in FIG. 1), is configured to form electronic pages/documents/mailpieces and printed. In a closed-loop mode, the pages, mailpieces or documents may contain an identifier which can be read by the system processor 12 for the purpose of obtaining the requisite mailpiece assembly instructions. In an open-loop mode, the pages or mailpiece may contain the OMR or Barcode symbology in a margin of the document. To be recognized by a particular printer, it may be necessary to convert the electronic data back into a suitable Print Control Language (PCL) format. This reversion will typically be performed by a printer driver 30 (see FIG. 1) selected by the operating system based upon the printer 32 called upon to perform the job. Notwithstanding the various processes available to convert the file back into the appropriate PCL format, the processed data are printed using a Print-to Printer Plug-in 24PP. Furthermore, the printed mailpiece content material 28 may be collated to form a stack ready for processing by the mailpiece insertion system 10. While the system architecture 20 depicts a stand alone printer 32 for printing the mailpiece content material 28, the printer 32 may be integrated with the mailpiece insertion system 10. As such, no transfer of the mailpiece content material 28 would be required, i.e., from printer 32 to the mailpiece insertion system 10. That is, there would not longer be a requirement to load the mailpiece content material 28 into one or more input trays 36*a*, 36*b*.

For thoroughness of discussion, the Plug-in Manager 24PI may receive object oriented data from one of two paths. The path described in the preceding paragraphs relates to the "print interception path" (i.e., the steps A-E above). Therein, a print command is executed or input to the application 22, the print stream data is intercepted, segmented/manipulated into a plurality of object-oriented data sets, and provided to the plug-in manager for subsequent processing, i.e., processing by the various plug-ins. As mentioned before, this path enhances throughput and flexibility to manipulate data. Alternatively, object oriented data, e.g., a PDF file FB (see FIG. 1*a*), may be provided directly to the Plug-in Manager from a PDF file source. For example, a main frame processor may produce an entire PDF mail run data file directly to the Plug-in manager for processing by the various plug-ins. In this alternate path, no requirement for data conversion is required, i.e., conversion to object oriented data, and the data may be processed immediately. As such, the time required to perform an object oriented data conversion is abated, though the above-described flexibility to modify the data is lost due to the inability to compartmentalize the data in data set/packets (each with its own configurable dictionary).

Figure 3:
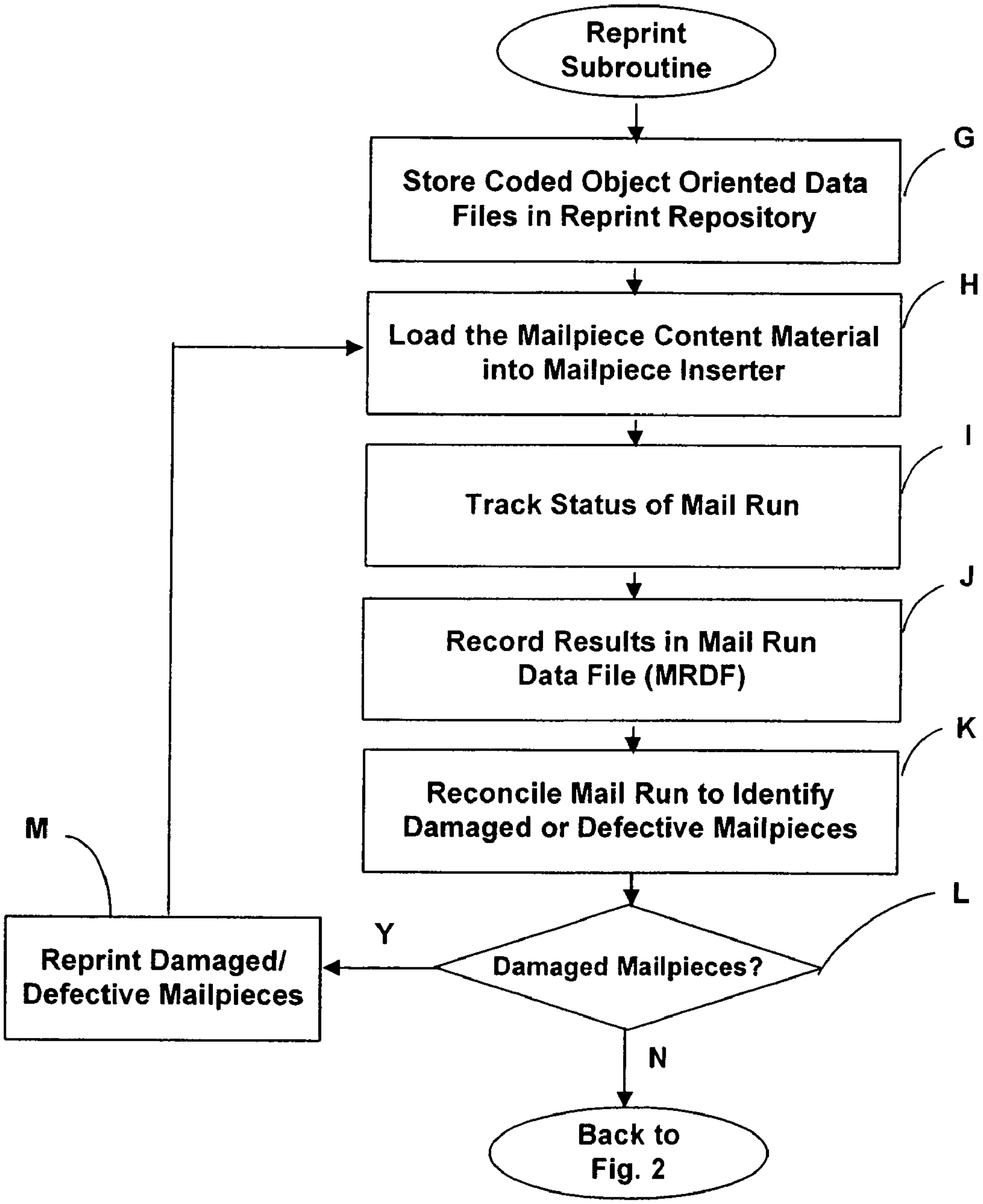
FIG. 3 is a block diagram of the method steps for a reprint function used for correcting damaged or defective mailpieces in the mailpiece inserter.

In FIGS. 1 and 3, the System Processor 12, in step G, is capable of storing all of the processed data, i.e., all of the data sets associated with a particular print job, into a repository 34 for subsequent use or further electronic file manipulation. A principle use thereof relates to reprinting damaged or defective mailpieces which may arise from a paper jam, insertion error or mishandled/missing sheets. In FIG. 3, the method steps for performing such reprint function are referred to as the "Reprint Subroutine" which is described in greater detail hereinafter.

In step H, the collation of mailpiece content material 28 is loaded into one or more input trays 36*a*, 36*b* of the mailpiece inserter 10 depending upon the configuration and/or size of the content material 28. In addition to the input trays 36*a*, 36*b*, the mailpiece inserter 10 may include a pair of insert trays 38*a*, 38*b* for combining inserts (e.g., advertisements, coupons, informational literature, etc.) with the mailpiece content material 28. There, the content material 28 is fed into the mailpiece inserter 10 and electronically and/or optically scanned as the content material 28 is handled and conveyed. That is, the assembly or scan code AC may be read to obtain information critical to the assembly of the fabricated mailpiece 40 and/or the various operations to be performed by the mailpiece inserter 10. As mentioned earlier, the assembly scan code AC may contain a variety of information/instructions/commands including the number of pages in the document, whether the document is to be duplex printed, whether or not inserts are to be combined or added to the content material, etc.

In step I, the Inserter Control System (ICS) 501N of the mailpiece inserter 10 senses and relays information concerning the status of the mail run to the Control System Engine (CSE) 50SE of the server/system processor 14. Inasmuch as the mailpiece inserter 10 incorporates a variety of optical sensors and scanning devices (not shown) e.g., photocells, disposed along the feed path of the inserter 10, mailpieces may be independently tracked by the ICS 50 to determine if a mailpiece was successfully completed.

In step J, the CSE 50SE then develops a list of completed job runs and records the same in a Mail Run Data File (MRDF) 52. To appreciate the scope of the stored information, the MRDF 52 contains specific job run information about the processing of each mailpiece (i.e., the assembly instructions pertinent to each mailpiece) including the status information concerning which mailpieces where successfully completed. Additionally, the MRDF 52 contains information concerning when and/or where (i.e., at what station) did the process fail (e.g., a paper jam,) and which mailpieces were affected. While the CSE 50 and the MRDF 52 controls/contains information specific to individual mailpieces involved in a particular mailpiece fabrication job, the Control System Applications (CSA) files 56 and Control System Database File (CSDF) 58 controls/contains information specific to the mailpiece fabrication job. For example, the Control System Applications files 56 may be controlling more than one mailpiece fabrication job, e.g., three jobs across three (3) mailpiece inserters 10. Similarly, while the MRDF 52 may store information specific to each individual mailpiece for a specific mailpiece fabrication job, the CRDF 58 may store information specific to each job run, e.g., the estimated time to completion or number envelops used in a particular mailpiece inserter 10.

In step K, the CSE 50SE queries the list of completed job runs (i.e., resulting in a successfully fabricated mailpiece) located in the MRDF 52 and deletes the reprint file associated with each, i.e., the reprint file located in the reprint repository 34. As such, the remaining files are those which contain a reprint file, hence, the MRDF 52 is reconciled to identify/list damaged and defective mailpieces. Accordingly, the user may then elect to display the list of jobs having a reprint file and any other information contained in the MRDF 52 for the job. From the list, the user can elect to reprint all of the damaged or defective mailpieces or select particular print jobs (e.g., those which may have been assigned a high priority) from the complete reprint file list. Optionally, the user may elect to preview one or more mailpieces (i.e., using the Print Preview plug-in) to validate certain information which may have been the cause for, or given rise to, the defective mailpiece assembly. For example, the assembly/scan code AC may have been improperly coded for communicating the assembly commands to the ICS 50IN of the mailpiece inserter 10.

Once the user selects which mailpieces which are to be reprinted, the CSE 50SE generates an index of the content material pages 28 and disables all unrelated plug-ins of the Mailpiece Creation Print Manager 24. The system disables plug-ins to reduce processing capacity/time for the User PC. The remaining enabled plug-ins generally include the Print-to-Printer plug-in 24PP and, optionally, the Print Preview plug-in (not shown). In step L, the CSE 50SE loads the corresponding reprint files from the reprint repository 34 and, in step M, prints the content material 28 for processing by the mailpiece inserter 10. The method then progresses, once again, through steps H-K for only those selected mailpieces identified for reprint and iterate through these steps as many times as may be necessary or requested by the operator.

While the object-oriented data files (i.e., the coded files) in Step E (FIG. 2) provide additional flexibility with respect to reprinting damaged or defective mailpieces, the object-oriented data files also enable the user/system operator to obtain a full visual picture of the mailpiece content and, as a result, offers the unique opportunity to introduce a graphics editing tool for implementing fields, rules and expressions. Using a networked system architecture, the user/operator can use any PC-based input and/or display device available and retrieve an image of any selected mailpiece of a mailpiece job run. That is, graphic user interface devices may be installed at the mailpiece inserter 10, the system processor 12, or in connection with the User PC 10, for the purpose of visually inspecting or editing mailpiece content material 28.

Figure 4:
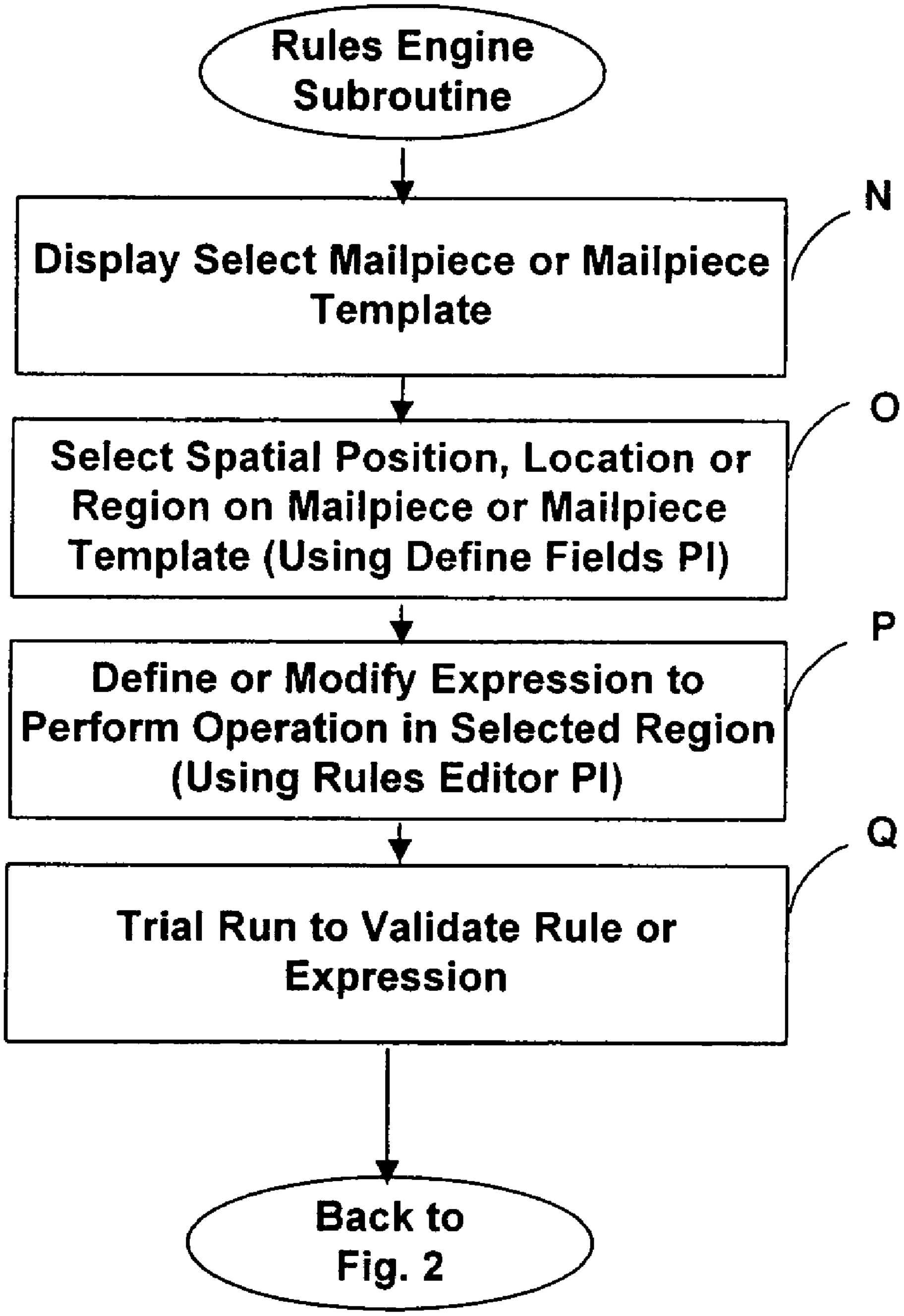
FIG. 4 is a block diagram of the method steps for a graphics tool for defining fields, developing rules and writing expressions in connection with the fabrication of the mailpiece documents or use in the mailpiece inserter.

Referring additionally to FIG. 4, the method steps for introducing such a graphics tool into the system architecture 20 are shown. In terms of the method steps or algorithms, the graphics editing tool is referred to as the "Rules Engine Subroutine" which invokes several additional plug-ins or modules of the Mail Creation Print Manager 24 (see FIG. 1).

In step N, at least one mailpiece or mailpiece template is displayed on a monitor. Using the Define Fields plug-in Step O, the user selects, by any one of a variety of known highlighting techniques, a spatial position, location or region on the sample mailpiece or mailpiece template. Typically, a pointer is anchored, dragged and released/dropped to define a rectangular region established by the movement within the virtual two-dimensional plane of the input device (typically a mouse having a ball pick-up). Alternatively, other shapes may be used depending upon the shape designation by the user/system operator, e.g., a circle, ellipse or other shape may be useful for other applications.

Using the Rules Editor, the operator/user may, in step P, define, create or modify an expression for performing certain operations. The expression will generally be directly related to the information contained within the designated region, though the expression need not be exclusively associated with the information therein. For example, and referring to FIG. 1*a*, two designated regions R1 and R2 may be defined in a given document 28. The first region R1 relates to the current page number of the document 28 and the second region R2 relates to the total number of pages in the document 28. The regions may be designated by: (a) selecting a define field operation/command button on the main tool bar of the Define Fields plug-in, (b) selecting an origination point in two dimensional space (in the plane of the image), using the cursor, proximal to one of the numerals "1" and "4", (c) dragging the cursor over the respective numeral and (d) selecting a termination point to define the two dimensional region, i.e., a length and height dimension, surrounding or slightly oversized relative to the respective numeral. The Define Fields plug-in then displays the highlighted information to the user in a dialog box for the user to visually confirm and/or elect to make certain modifications or rules based on the information/data contained therein. It should be appreciated that the rules editor may be used independently of any field. Once the user defines a field it is available in the rules editor for use in an expression.

In step P, an expression is written by the user/operator using the Rules Editor in connection with the selected region. The expression provides unique or specific commands which may not be required or universally desirable for all mailpiece job runs. Further, while the Rules Editor accepts the input from the user/operator, the Rule Engine 24RE plug-in executes the expression upon processing the mailpiece data. For example, an expression may read—"When the value in field R2 is equal to the value in field R1, then begin new document with the next page", or "When the value in field R2 is equal to the value in field R1, break the mailpiece document and insert all pages [i.e., since the last time this condition was met], in an envelope". Accordingly, only when "Page 4 of 4" is processed will a new document or mailpiece be created, and/or only will these pages be inserted into an envelope.

In step Q, the Mailpiece Creation Print Manager 22 may test or simulate the efficacy of the expression to ensure that the job will run according to the desired command(s). Generally, the user/operator will select a quantity of mailpiece pages or documents suitable for providing an adequate sample size for testing the rule or expression. Once successfully tested, this command/expression will be processed by the Rules Engine 24RE Plug-in and converted to an appropriate OMR or Barcode mark by the Assembly/Scan Code Generator 24AC plug-in PI (upon returning to Step E of FIG. 2).

Figure 5:
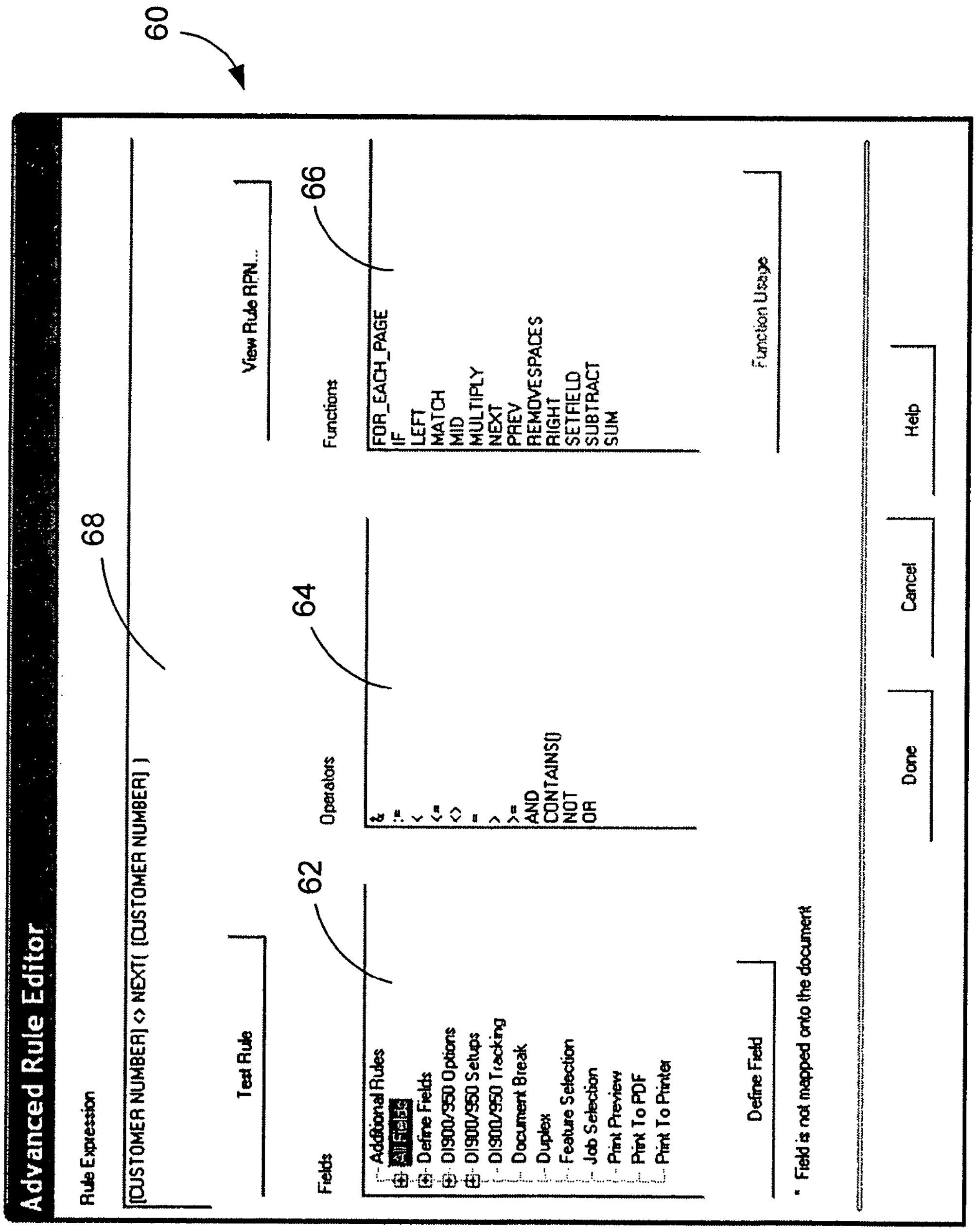
FIG. 5 depicts a User Interface (UI) of a rules editor for selecting fields, operations and functions for use by a rules engine plug-in for processing mailpiece documents.
Figure 6:
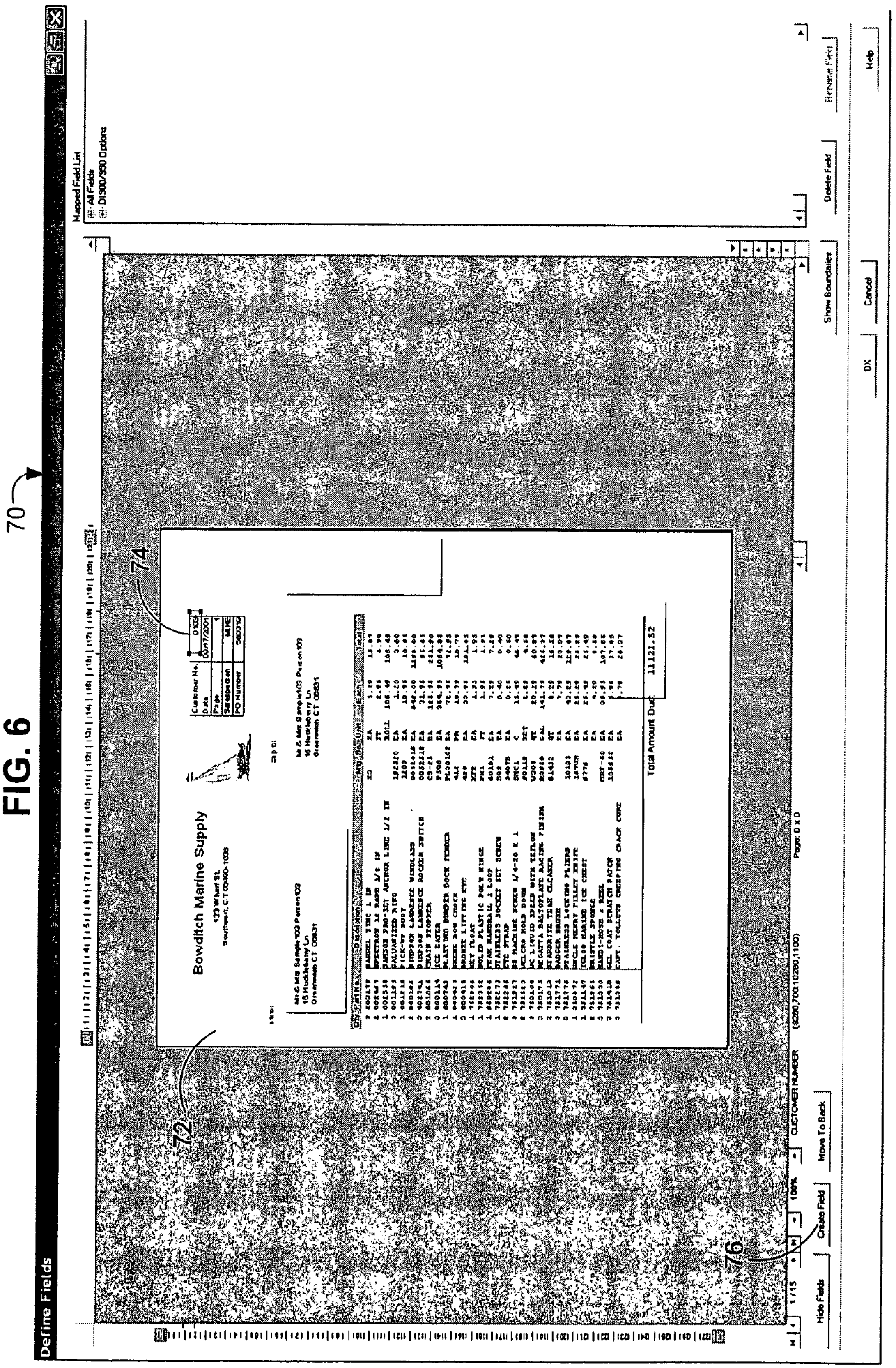
Figure 7:
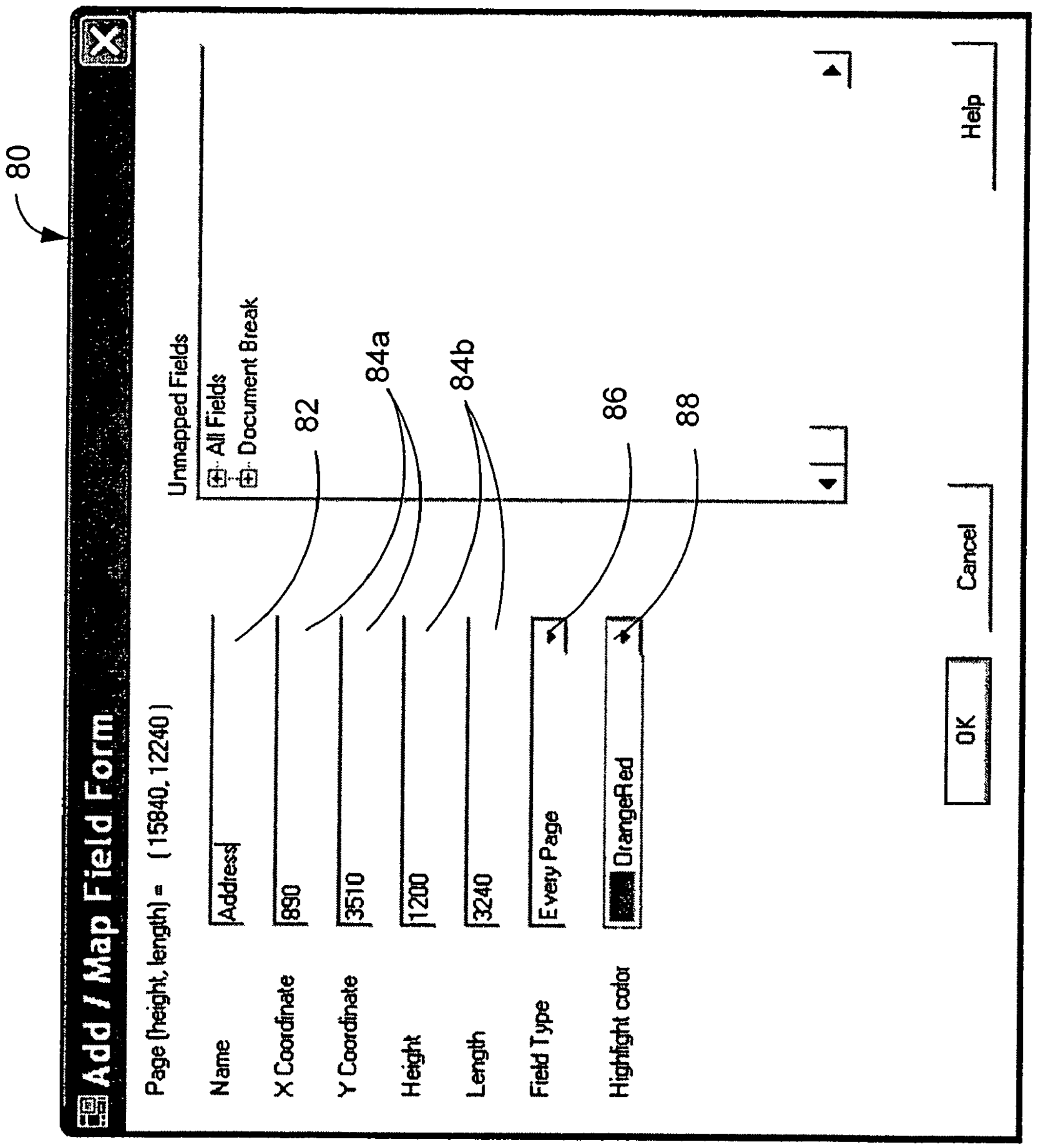
FIG. 7 depicts a dialog box for operator input of selected attributes in connection with a defined field.

FIGS. 5 through 7 depict various user interface dialog boxes used in connection with the Rules Engine. Specifically, FIG. 5 depicts a typical Rules Editor interface 60 wherein previously defined fields 62, operations 64 and functions 66 are displayed to the user for developing a Rule Expression 68. For example, if a user desires to effect a "next" page with each newly found customer number, then the user may scroll down and select "CUSTOMER NUMBER" in the Fields section 62 of the dialog box 60. To continue developing the expression, the user then selects the symbol "< >" indicative of the operation "not equal to" in the Operations section 64. To select the "Next" page function, the user selects "NEXT" in the Function section 66. Finally, the user moves back to the Fields section 62 to select "CUSTOMER NUMBER". All of the selections will progressively appear in the Rule Expression section 68 of the dialog box 60.

To Define a new field, i.e., a field which may not be pre-existing, the user selects the Define Fields user interface dialog box 70 shown in FIG. 6. Therein, a PDF image of a mailpiece 72 is displayed for the user. If "CUSTOMER NUMBER" was not a pre-existing Field, the user may draw a rectangular box 74, as previously described, around the region associated with the customer number and select the "create field" input button 76. As such, the rules engine 24RE will process this information to capture the pixels associated with the object drawn. In this example, the pixels selected are associated with the "Customer Number". In FIG. 7, a related UI entitled "Add/Map Field Form" 80 is displayed (following the user's selection of the "Create Field" button 76) for the user to input the various attributes 82, 86 and 88 of the selected region/field. A name will be input in the "Name" field 82 and the Define Fields plug-in 24DF will calculate the X-, Y-coordinates and the Height and Length of the drawn field, i.e., the rectangular box 74 surrounding the customer name. These calculations may automatically be input by the plug-in fields 84*a* and 84*b*. Other information such as the Field Type and/or Highlight Color may be selected in drop-down boxes 86 and 88, respectively.

Upon spatially selecting the Field (in the Define Fields UI 70) and inputting its attributes (in the Add/Map Field Form 90), a field having the designated "Name" will appear in the "Field" section 62 of the Rules Editor. As such, this newly defined field may be used in connection with the various operators and functions identified in the Rules Editor Dialog box.

While the system architecture 20 depicts a server 12 electronically interposing the User PC 14 and the mailpiece inserter 10, it will be appreciated that the system 20 may operate with the same functionality without a central system server or processor 12. In this embodiment, a User PC 14 is tied directly, via the network line NL, to the mailpiece inserter 10 and is adapted to include a stand-alone control system engine 50SE, a mail run database 52 and various control system applications 56. The server or system processor 12, therefore, may be viewed as a convenient home for centrally located program code such as the control system engine 50SE. As such, the control system engine 50SE need not be loaded, nor processing space duplicated on several individual User PCs, but may be shared amongst many users who individually and uniquely generate print jobs and mail run data files.

In summary, the inventive method formats documents and intercepts the Print Control Language (PCL) print stream thereof (or any data stream or output file produced by conventional application software) to facilitate the creation, modification and printing of mailpieces produced by a mailpiece inserter. The print stream modification (i.e., to object oriented data in the form of data sets each having an attached object dictionary) enables incremental processing/printing of the data. That is, the printer can initiate document production on one logical document as the plug-in manager processes other logical documents. Accordingly, the logical documents can be printed "on the fly" without the requirement to save the data in an external file. Furthermore, by printing completed documents while others are still "in-process", the completed documents may be installed/input to the mailpiece inserter so that mailpiece assembly/fabrication can be initiated quickly. It will therefore be appreciated that the throughput of mailpiece content material is substantially enhanced by the method and system architecture of the present invention.

Moreover, the print driver program code is adapted to intercept the print stream and convert the application file into an Object Oriented Document (OOD) or Portable Document Format (PDF) file. In addition to providing flexible document distribution, the converted OOD/PDF file provides an ability to assign attributes to various fields and regions of the mailpiece content material. As such, conversion into an object oriented data file or PDF provides a unique opportunity to enable and perform manipulation of the electronic application file on a (i) page-by-page, (ii) mailpiece-by-mailpiece or (iii) document-by-document, or (iv) on the basis of an entire mailpiece data file.

The OOD/PDF file enables the user/system operator to define fields, read from identified regions, extract information from select regions, perform mathematical and other operations on information contained in a region, insert new information, re-order pages of the mailpiece contents, change the document pagination, add and/or delete pages from the mailpiece content material, etc. Therefore, conversion to an OOD/PDF file provides significantly greater flexibility and capability to modify, manipulate, insert or extract information in connection with mailpiece fabrication. In the prior art, such capability was generally directed to entire documents for ease of distribution. Furthermore, the ability to manipulate the inserter system was only availably through the combined efforts of the OEM (skilled in the programming language used to operate the mailpiece inserter) and the customer (having knowledge concerning the unique requirements of the mailpiece contents). The present invention, therefore, enables the user/operator to customize the operation of the mailpiece inserter without the need for OEM support or the program skills of the OEM.

It should also be appreciated that the rules engine is not specific to the production of mailpieces, but is a mechanism that allows decisions to be made based on the content of any object oriented data file/document. Furthermore, it allows for the programmatic manipulation of the object-oriented content. The rules engine is extensible by permitting users to create individualized functions. These functions have the same access to document content and the general processing environment as the built-in functions. This, therefore, allows users to incorporate their specific business logic into rules/expressions.

It is to be understood that the present invention is not to be considered as limited to the specific embodiments described above and shown in the accompanying drawings. The illustrations merely show the best mode presently contemplated for carrying out the invention, and which is susceptible to such changes as may be obvious to one skilled in the art. The invention is intended to cover all such variations, modifications and equivalents thereof as may be deemed to be within the scope of the claims appended hereto.

What is claimed is:

1. A method for reprinting damaged mailpieces for use in a mailpiece inserter, the inserter being network connected to a User PC and System Processor, the method comprising the steps of:

producing object-oriented data of the mailpiece content material including a scan code, storing the object-oriented data in a reprint repository;

tracking the status of a mail run as mailpieces are fabricated by the mailpiece inserter;

recording the results of the mail run in a reprint file, the recorded results indicative of whether a mailpiece was successfully fabricated, and printing the reprint files in connection with unsuccessfully fabricated mailpieces;

wherein the step of producing an object-oriented data file includes the steps of:

segmenting the object-oriented data into a plurality of data sets;

processing the plurality of data sets to produce mailpiece content material and, attaching an object dictionary to each data set.

2. The method according to claim 1 wherein the reprint repository is disposed in combination with the system processor.

3. The method according to claim 1 wherein the reprint repository is disposed in combination with the user processor.

4. The method according to claim 1 wherein the recording step further comprises the steps of developing a list of successfully completed mailpieces and deleting the reprint file in connection with successfully fabricated mailpieces.

5. The method according to claim 4 further comprising the steps of displaying a list of reprint files and selecting files to be reprinted.

6. The method according to claim 4 further comprising the steps of displaying a list of reprint files, previewing the reprint files to determine a cause for the unsuccessfully fabricated mailpiece and selecting files to be reprinted.

7. The method according to claim 1 wherein the step of processing the plurality of data sets is performed by at least one plug-in to manipulate the data sets.

8. The method according to claim 7 further comprising the steps of generating an index of the mailpiece content material for reprint and disabling unrelated plug-ins to manipulate the data sets.

9. The method according to claim 1 wherein the object-oriented data is defined by Portable Document Format (PDF) objects.

10. The method according to claim 1 wherein the data sets each comprise a plurality of data packets.

11. The method according to claim 1 wherein the plurality of data sets are combined to produce mailpiece pages.

12. The method according to claim 11 wherein the mailpiece pages are combined to produce mailpiece documents.

13. The method according to claim 12 wherein the electronic mailpiece documents are combined to produce a mailpiece data file.

* * * * *